CIRCUIT ARRANGEMENT FOR MATRIX STORERS WITH LINEAR TRIGGERING
Filed March 18, 1963
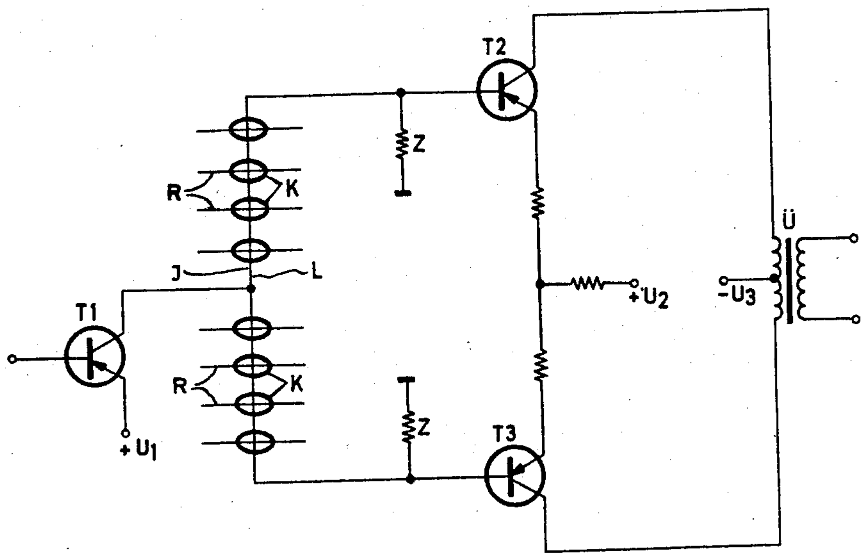

United States Patent Office 3,267,291

Patented August 16, 1966

3,267,291

CIRCUIT ARRANGEMENT FOR MATRIX STORERS WITH LINEAR TRIGGERING

Edgar Heimbach, Munich, Germany, assignor to Siemens & Halske Aktiengesellschaft, Berlin and Munich, Germany, a German corporation Filed Mar. 18, 1963, Ser. No. 265,964
Claims priority, application Germany, Mar. 27, 1962, S 78,687
4 Claims. (Cl. 307—88.5)

The invention disclosed herein relates to a circuit arrangement for matrix storers with linear triggering and is particularly concerned with connecting to a readout amplifier the line of such a matrix arrangement which carries the reading or sensing impulses, and is further concerned with the disposition of the line over which are supplied the write-in impulses which are to be stored (information line).

It is known, in connection with magnet core matrix storers, to dispose the reading or sensing wire in meandering fashion, diagonally through the matrix or, upon disposing the reading wire parallel to the column or lines, respectively, to reverse the sense of winding direction thereof, from core to core. This is done in order to reduce the effect of interference impulses or signals or to compensate interference impulses. Such disposition of the reading wire, within a matrix, entails considerable technological difficulties, particularly when using very small magnet cores; moreover, the known arrangements for the compensation of the interference impulses cannot be used at all in most cases in connection with matrix storers with linear triggering.

It would be possible, in connection with a magnet core matrix storer with linear triggering, for example, for the compensation of interference impulses or signals, to dispose the socalled information wires respectively in all lines or columns in identical direction but to reverse the direction of the readily wire respectively from line to line or from column to column. However, such a disposition of reading wires and information wires would require carrying the information wire outside about the matrix, always between two successive lines or columns, respectively, so as to enable disposal thereof in the same direction, in the next following column or line, respectively. Such disposition of the information wire is likewise undesirable. High interference voltages are induced in the reading or sensing line upon entering (writing-in) information, since the information line is, in connection with matrix storers with linear triggering, as a rule disposed in parallel with the reading line. It is particularly in the case of matrix storers with linear triggering, in which the information wire is also used as reading wire, entirely impossible to avoid, upon entering an information, appearance of interference voltages at the ends of the reading wire.

Accordingly, the object of the invention resides in effecting to as great an extent as possible, compensation of interference impulses or signals appearing, upon entering (writing-in) an information, while disposing in a manner as simple as possible, the information and reading lines within the matrix arrangement.

According to the invention, this object is realized by providing each information (write-in) line with a center tap to which are conducted the information impulses or signals which are to be stored in the matrix arrangement, and by connecting the line which serves as a reading or sensing line, with the two inputs of a differential amplifier.

The circuit arrangement according to the invention makes use of the recognition of the fact that signals which appear simultaneously and in phase at the two inputs of a differential amplifier, are compensated. As a consequence of the extension of the information impulses to the center tap of the information lines, interference pulses will symetrically appear on the line serving as a reading line, that is, they will appear at both ends of such line simultaneously and in phase. The circuit arrangement according to the invention is particularly advantageous in connection with matrix storers with linear triggering, wherein the information lines are utilized to serve also as reading or sensing lines. Since the respective lines and columns of a matrix arrangement, especially, a matrix arrangement comprising magnet cores with rectangular hysteresis loop, represent a wave conductor or guide, it is moreover particularly advantageous to terminate the two ends of the reading line with a resistance which is equal to the characteristic wave impedance of the line.

Further details of the circuit arrangement according to the invention will appear from the description which is rendered below with reference to the accompanying drawing.

The single figure of the drawing shows an example of a circuit arrangement according to the invention.

The illustrated circuit arrangement comprises a first transistor T1 which delivers the information pulses for entry thereof (writing-in) in the magnet cores K, and two further transistors T2 and T3 which jointly form the input stage of a differential amplifier. According to the invention, the line J, which carries the information (write-in) pulses, is provided with a center tap, to which is connected the collector of the transistor T1. Accordingly, upon making the transistor T1 conductive, the collector current will be divided with respect to the two halves of the information line J. As a result of this subdivision of the current on the information line J, impulses with identical phase will appear at the two ends of the information line, which ends are respectively connected with the base electrodes of the two transistors T2 and T3. Lines R represent cooperable information lines in the other cordinate direction.

Several possibilities must be considered in connection with the operation of the circuit arrangement:

As a first possibility, the interference impulses originating from an information (write-in) pulse and appearing on the base electrodes of the two transistors T2 and T3, can be compensated by causing these impulses to make the two transistors conductive and thereupon compensating the two collector currents of the transistors T2 and T3 in the differential repeater or transformer U. This mode of operation can be realized by making the emitter potential +U2 higher than or equal to the emitter potential +U1 of the transistor T1.

It is likewise possible, in a manner just as simple as the above explained mode of operation, to utilize the interference pulses appearing at the two ends of the information line J, for placing the two transistors T2 and T3 at cutoff, instead of amplifying them by the action of these transistors. This may be realized by making the emitter potential +U2 of the two transistors lower than the emitter potential +U1 of the transistor T1. When the transistor T1 becomes conductive, its collector and therewith also the base of the transistor T2 and that of the transistor T3, will be at nearly the potential +U1 of the emitter of the transistor T1. Since it was assumed that the potential +U1 of the transistor T1 is higher than the potential +U2 of the emitters of the transistors T2 and T3, the latter transistors will be automatically placed at cutoff by the interference pulses appearing at the ends of the information line. It is of course to be observed, in such mode of operation, that the difference between the emitter potenials +U1 and +U2 must always be lower than or at the most equal to the permissible emitter-base barrier voltage of the two transistors T2 and T3.

A third possibility resides in using a transistor T1 of the npn-type while using transistors T2 and T3 of the pnp-type. In such case, when the transistor T1 becomes conductive, the negative emitter potential of the transistor T1 will practically obtain at the base of the transistor T2 and at the base of the transistor T3, the voltage O will predominate between the base and the collector of the transistors T2 and T3, and the transformer U is thus short-circuited.

As mentioned before, each number of a matrix arrangement represents a wave conductor or guide. In accordance with a particularly advantageous embodiment of the circuit arrangement according to the invention, in which the information line is also used as a reading or sensing line, the base resistance of the transistor T2 and of the transistor T3, respectively, are therefore made as high as the wave resistance of the information line J which also serves as the reading line L.

Changes may be made within the scope and spirit of the appended claims which define what is believed to be new and desired to have protected by Letters Patent.

I claim:

1. A circuit arrangement for a matrix storer with linear triggering, especially a magnet core matrix storer, comprising a plurality of magnet cores, and information line for said storer passing through respective groups of said cores, provided with a center tap to which are conducted information pulses which are to be stored, a differential amplifier having two inputs, and means for connecting said inputs to the ends of the line serving as a reading line.

2. A circuit arrangement according to claim 1, wherein the information line also serves as the reading line.

3. A circuit arrangement according to claim 2, wherein both ends of the information line are connected with a resistance which is equal to the wave resistance of the line.

4. A circuit arrangement according to claim 1, comprising a first transistor having a base, emitter and collector, an information pulse source connected to said base, and the collector of which is connected with said center tap, a positive voltage source connected with the emitter of said first transistor, two further transistors each having a base, emitter and collector, the ends of said information line being respectively connected with the bases of said further transistors, a positive voltage source connected with the emitters of said further transistors, a transformer having a primary winding and a secondary from which an output is derived, said primary winding provided with a center tap connected with a negative voltage source, and means for connecting the collectors of said further transistors to the ends of said primary winding.

References Cited by the Examiner

UNITED STATES PATENTS 3,112,470 11/1963 Barrett et al. -------- 307—88.5

ARTHUR GAUSS, *Primary Examiner.*

J. BUSCH, *Assistant Examiner.*